United States Patent
Lee et al.

(10) Patent No.: US 10,942,308 B2
(45) Date of Patent: Mar. 9, 2021

(54) LIGHT SOURCE MEMBER AND DISPLAY DEVICE INCLUDING THE SAME

(71) Applicant: Samsung Display Co., Ltd., Yongin-si (KR)

(72) Inventors: Seongyeon Lee, Anyang-si (KR); Taewoo Lim, Cheonan-si (KR); Dongwoo Kim, Seoul (KR); Minsu Kim, Hwaseong-si (KR); Cheonjae Maeng, Suwon-si (KR); Keunwoo Park, Incheon-si (KR); Hongbeom Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/542,365

(22) Filed: Aug. 16, 2019

(65) Prior Publication Data

US 2020/0073040 A1 Mar. 5, 2020

(30) Foreign Application Priority Data

Aug. 28, 2018 (KR) .......................... 10-2018-0101097

(51) Int. Cl.
*F21V 8/00* (2006.01)
(52) U.S. Cl.
CPC ........... *G02B 6/005* (2013.01); *G02B 6/0035* (2013.01); *G02B 6/0073* (2013.01)
(58) Field of Classification Search
None
See application file for complete search history.

(56) References Cited

U.S. PATENT DOCUMENTS

| 2012/0039089 | A1* | 2/2012 | Hao | G02B 5/3041 |
| | | | | 362/607 |
| 2013/0222911 | A1* | 8/2013 | Coggio | G02B 5/0242 |
| | | | | 359/493.01 |
| 2014/0319995 | A1* | 10/2014 | Kim | G02B 6/0031 |
| | | | | 313/501 |
| 2015/0323711 | A1* | 11/2015 | Bessho | G02B 5/0242 |
| | | | | 349/71 |

(Continued)

FOREIGN PATENT DOCUMENTS

| EP | 3474068 | 4/2019 |
| JP | 2017-068250 | 4/2017 |

(Continued)

OTHER PUBLICATIONS

European Search Report dated Nov. 9, 2019, issued in European Patent Application No. 19193210.2.

*Primary Examiner* — Ryan Crockett
(74) *Attorney, Agent, or Firm* — H.C. Park & Associates, PLC

(57) ABSTRACT

A light source member including a guide panel, a light source disposed adjacent to at least one side of the guide panel, a low refractive layer disposed on the guide panel, and a color converting layer disposed on the low refractive layer and including a base resin and a quantum dot dispersed in the base resin, in which the low refractive layer includes a matrix part, a plurality of low refractive substances dispersed in the matrix part, and a void disposed in the matrix part, and an area occupied by the void is less than about 20% of an entire area of the low refractive layer.

20 Claims, 9 Drawing Sheets

(56) References Cited

U.S. PATENT DOCUMENTS

| | | | |
|---|---|---|---|
| 2016/0003998 A1* | 1/2016 | Benoit | G02F 1/133617 349/71 |
| 2017/0322359 A1* | 11/2017 | Park | G02B 6/005 |
| 2018/0031925 A1 | 2/2018 | Kong et al. | |
| 2018/0246373 A1* | 8/2018 | Nakamura | G02F 1/133528 |
| 2018/0252968 A1* | 9/2018 | Nakamura | G02B 6/0053 |
| 2019/0051484 A1* | 2/2019 | Nakamura | B32B 27/285 |
| 2019/0079240 A1* | 3/2019 | Hwang | G02B 6/0093 |
| 2019/0113664 A1* | 4/2019 | Yoshikawa | G02B 5/3041 |
| 2019/0121194 A1* | 4/2019 | Park | G02F 1/133502 |
| 2019/0310409 A1* | 10/2019 | Lee | G02B 6/0065 |
| 2019/0324192 A1* | 10/2019 | Park | G02B 6/0076 |
| 2019/0377229 A1* | 12/2019 | Song | H01L 33/504 |
| 2020/0012030 A1* | 1/2020 | Park | H01L 33/502 |
| 2020/0117030 A1* | 4/2020 | Lee | G02F 1/1336 |

FOREIGN PATENT DOCUMENTS

| | | |
|---|---|---|
| KR | 2017-0091756 | 8/2017 |
| KR | 10-2019-0118220 | 10/2019 |

\* cited by examiner

LIGHT SOURCE MEMBER AND DISPLAY DEVICE INCLUDING THE SAME

CROSS-REFERENCE TO RELATED APPLICATION

This application claims priority from and the benefit of Korean Patent Application No. 10-2018-0101097, filed on Aug. 28, 2018, which is hereby incorporated by reference for all purposes as if fully set forth herein.

BACKGROUND

Field

Exemplary embodiments of the invention relate generally to a light source member and a display device and, more specifically, to a light source member including a low refractive layer and a display device including the same.

Discussion of the Background

Various types of display devices are being used to provide image information. Among display devices, a liquid crystal display device has an advantage of low power consumption, and is thus used in various display devices, such as a large sized display device and a portable display device. In a liquid crystal display device, various kinds of optical members may be added to a light source unit to increase color gamut and improve light efficiency.

Recently, a color converting layer is used for the light source unit to display excellent optical features, and a low refractive layer is used to function as a light guide plate. However, during the manufacture or the assembly of the light source unit and/or a display panel including the same, the color converting layer, the low refractive layer, and the like may be damaged or have reduced reliability.

The above information disclosed in this Background section is only for understanding of the background of the inventive concepts, and, therefore, it may contain information that does not constitute prior art.

SUMMARY

Exemplary embodiments provide a light source member with an improved reliability and a low refractive layer with an improved delamination force.

Exemplary embodiments also provide a display device having excellent optical features and reliability by improving delamination force of a low refractive layer in a light source member.

Additional features of the inventive concepts will be set forth in the description which follows, and in part will be apparent from the description, or may be learned by practice of the inventive concepts.

A light source member according to an exemplary embodiment includes a guide panel, a light source disposed adjacent to at least one side of the guide panel, a low refractive layer disposed on the guide panel, and a color converting layer disposed on the low refractive layer and including a base resin and a quantum dot dispersed in the base resin, in which the low refractive layer includes a matrix part, a plurality of low refractive substances dispersed in the matrix part, and a void disposed in the matrix part, and an area occupied by the void is less than about 20% of an entire area of the low refractive layer.

The low refractive layer may have a refractive index in a range of about 1.0 to about 1.26.

The low refractive substances may include at least one of hollow silica, aerogel, a porous inorganic particles including a pore, and a porous organic particles including a pore.

The light source member may further include a capping layer disposed between the low refractive layer and the color converting layer, the capping layer including at least one of a silicon nitride, a silicon oxide, and a silicon oxynitride.

The capping layer may have a thickness of at least about 0.2 μm.

The light source member may further include a barrier layer disposed on the color converting layer and including at least one inorganic layer.

The barrier layer may further include an organic layer disposed on the at least one inorganic layer.

The low refractive layer may have a thickness in a range of about 0.5 μm to about 2.5 μm.

The low refractive layer may further include a resin.

The guide panel may include a plurality of light extraction pattern parts disposed on a bottom surface thereof.

Each of the light extraction pattern parts may have a convex lens shape protruding from the bottom surface of the guide panel.

The light source may include a circuit board and a light emitting diode package disposed on the circuit board.

The light emitting diode package may be configured to emit first light having a central wavelength in a range of about 440 nm to about 460 nm, and the quantum dot may include at least one of a first quantum dot configured to be excited by the first light to emit second light having a central wavelength in a wavelength range of about 520 nm to about 550 nm, and a second quantum dot configured to be excited by at least one of the first light and the second light to emit third light having a central wavelength in a wavelength range of about 600 nm to about 650 nm.

The light source may be configured to emit blue light, and the quantum dot may include at least one of a first quantum dot configured to be excited by the blue light to emit green light, and a second quantum dot configured to be excited by the blue light to emit red light.

A light source member according to another exemplary embodiment includes a light source configured to emit blue light, a guide panel having one side surface facing a light emitting surface of the light source, a low refractive layer disposed on the guide panel, a capping layer disposed on the low refractive layer and including an inorganic material, a color converting layer disposed on the capping layer and including a quantum dot, and a barrier layer disposed on the color converting layer, in which the low refractive layer includes a matrix part, a plurality of low refractive substances dispersed in the matrix part, and a void disposed in the matrix part, and an area occupied by the void is less than about 20% of an entire area of the low refractive layer.

The low refractive layer may be disposed directly on the guide panel.

The barrier layer may cover the color converting layer.

A display device according to yet another exemplary embodiment includes a light source member and a display panel disposed on the light source member, in which the light source member includes a guide panel, a light source disposed adjacent to at least one side of the guide panel, a low refractive layer disposed on the guide panel, and a color converting layer disposed on the low refractive layer and including a base resin and a quantum dot dispersed in the base resin, in which the low refractive layer includes a matrix part, a plurality of low refractive substances dispersed in the matrix part, and a void disposed in the matrix part, and an area occupied by the void is less than about 20% of an entire area of the low refractive layer.

The display panel may include a liquid crystal display panel including a first substrate, a second substrate, and a liquid crystal layer disposed between the first substrate and the second substrate.

The light source member and the display panel may be spaced apart from each other It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
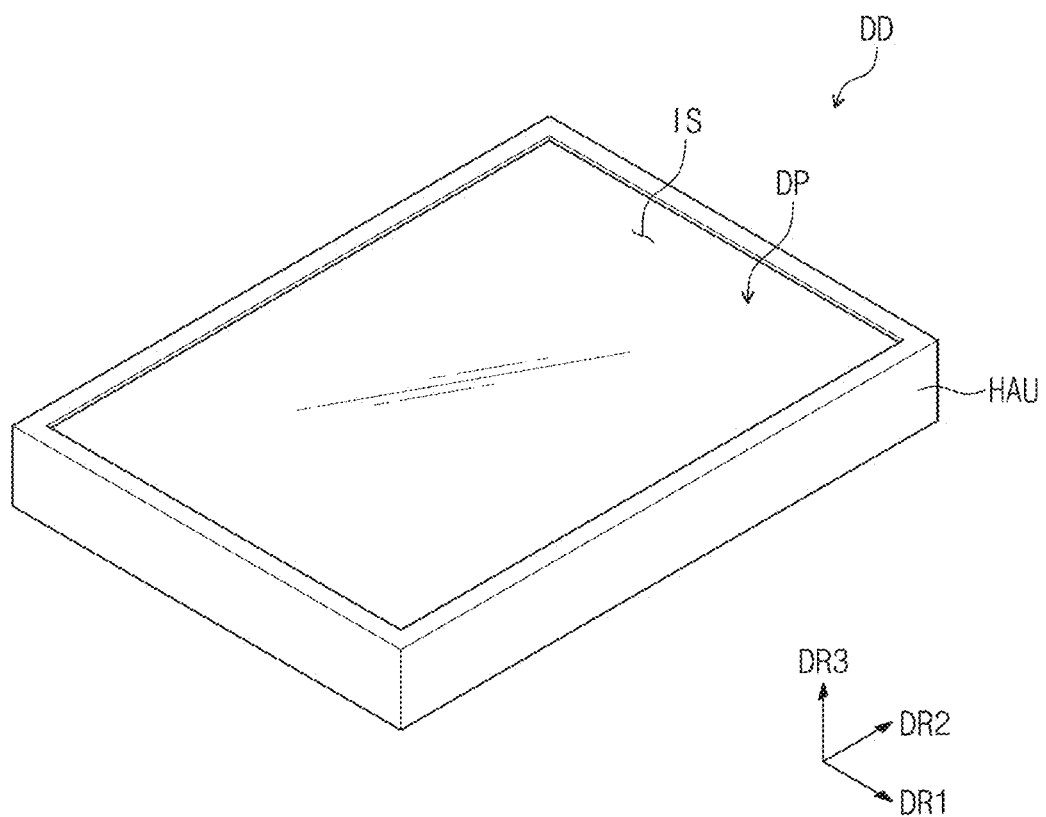
FIG. 1 is a perspective view of a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
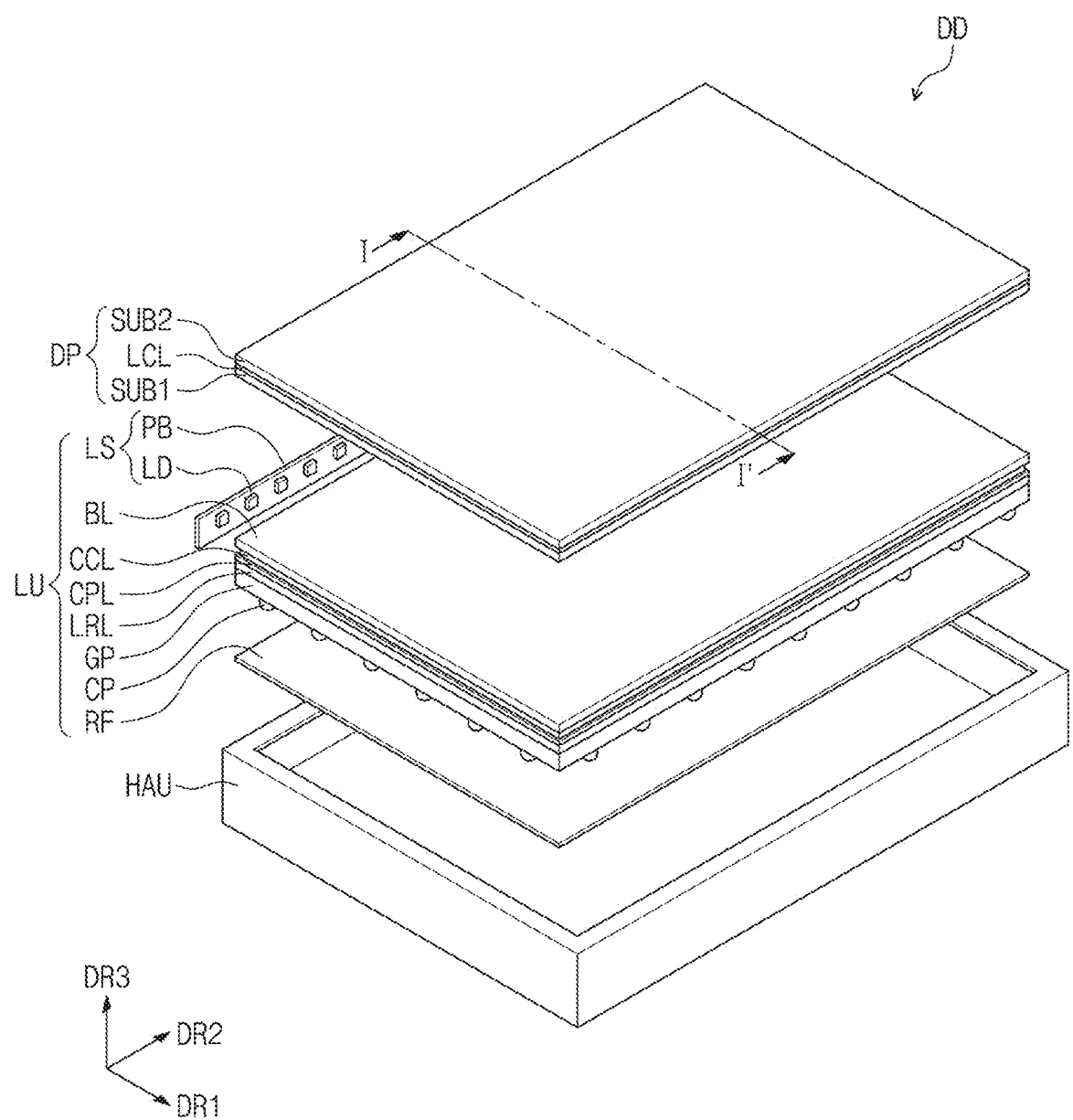
FIG. 2 is an exploded perspective view of a display device according to an exemplary embodiment.
Figure 3:
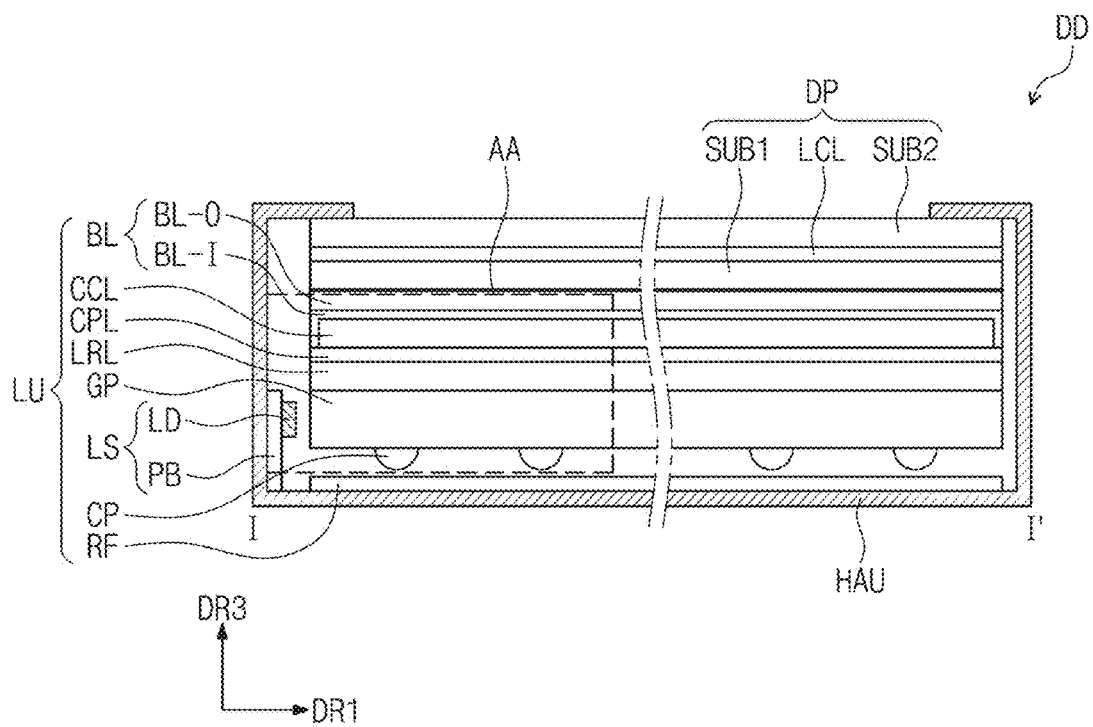
FIG. 3 is a cross-sectional view taken along line I-I' of FIG. 2.
Figure 4:
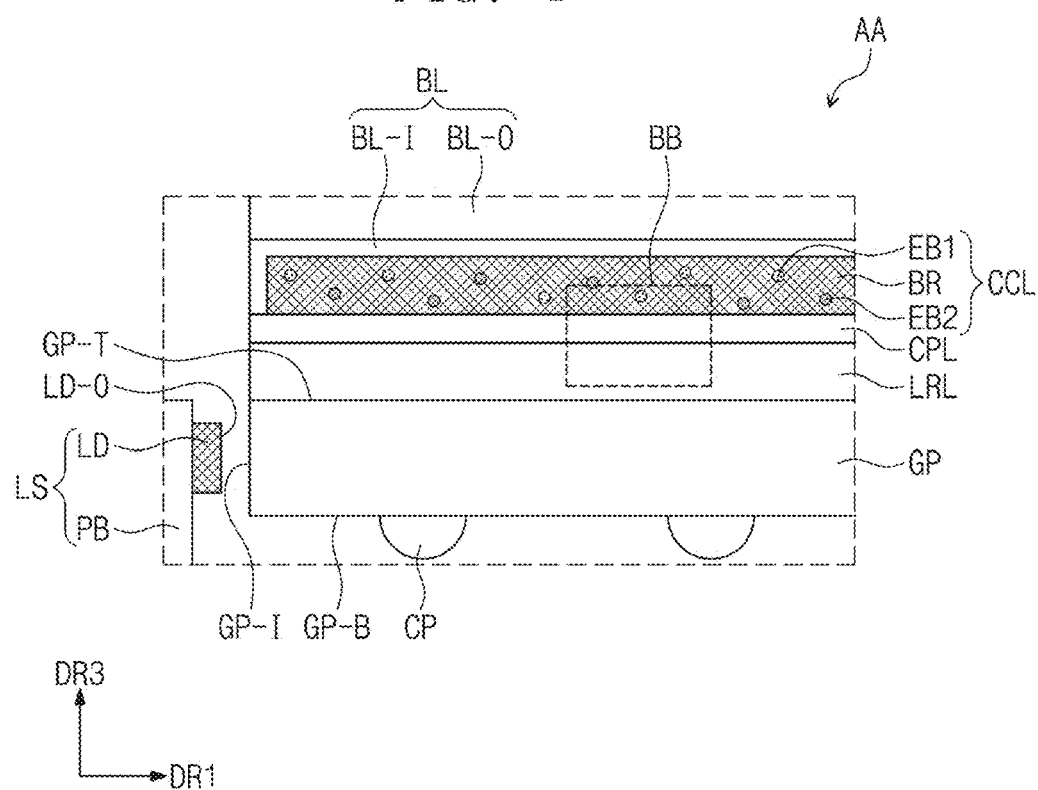
FIG. 4 is an enlarged view of a portion AA of FIG. 3.

FIG. 1 is a perspective view of a display device according to an exemplary embodiment. FIG. 2 is an exploded perspective view of a display device according to an exemplary embodiment. FIG. 3 is a cross-sectional view taken along line I-I' of FIG. 2. FIG. 4 is an enlarged cross-sectional view of an area AA of FIG. 3.

Referring to FIG. 1, a display device DD according to an exemplary embodiment may include a display panel DP and a housing HAU for accommodating the display panel DP and a light source member LU (refer to FIG. 2). The housing HAU may cover the display panel DP to expose a top surface, e.g., a display surface IS of the display panel DP. In particular, the housing HAU may cover a portion of the top surface in addition to a side surface and a bottom surface of the display panel DP. However, the inventive concepts are not limited thereto. In some exemplary embodiments, for example, the housing HAU may cover the side surface and the bottom surface of the display panel DP and expose the entire top surface.

Although a first directional axis DR1 to a third directional axis DR3 are illustrated in FIG. 1, the directional axis described herein may be relative concepts. For example, a direction of the third directional axis DR3 may be defined as a direction to which an image is provided. Also, the first directional axis DR1 and the second directional axis DR2 may be perpendicular to each other, and the third directional axis DR3 may be a normal direction with respect to a plane defined by the first directional axis DR1 and the second directional axis DR2. In FIG. 1, the plane defined by the first directional axis DR1 and the second directional axis DR2 may be the display surface IS on which an image is provided.

FIG. 2 is an exploded perspective view of a display device according to an exemplary embodiment. The display device DD according to an exemplary embodiment may include a light source member LU and a display panel DP disposed on the light source member LU. The display device DD according to an exemplary embodiment may further include a housing HAU for accommodating the display panel DP and the light source member LU.

The light source member LU according to an exemplary embodiment may include a guide panel GP, a light source LS disposed at one side of the guide panel GP, a low refractive layer LRL disposed on the guide panel GP, and a color converting layer CCL disposed on the low refractive layer LRL. The light source member LU may further include a capping layer CPL disposed between the low refractive layer LRL and the color converting layer CCL, and a barrier layer BL disposed on the color converting layer CCL. Also, a plurality of light extraction pattern parts CP may be disposed on a bottom surface GP-B of the guide panel GP.

In the light source member LU according to an exemplary embodiment, the guide panel GP, the light extraction pattern parts CP, and the low refractive layer LRL may be optical members that transmit light emitted from the light source LS to the color converting layer CCL.

The light source member LU according to an exemplary embodiment may further include a reflective layer RF. The reflective layer RF may be disposed below the guide panel GP. The reflective layer RF may face the light extraction pattern parts CP. The reflective layer RF may include a reflective film or a reflective coating layer. The reflective layer RF may reflect light emitted from the bottom surface GP-B of the guide panel GP back to the guide panel GP.

The light source LS of the light source member LU according to an exemplary embodiment may include a circuit board PB and a light emitting diode package LD disposed on the circuit board PB.

The circuit board PB may provide power to the light emitting diode package LD mounted thereto. For example, the circuit board PB may provide a dimming signal and a driving voltage to the mounted light emitting diode packages LD. The circuit board PB may include at least one insulation layer and at least one circuit layer. For example, the circuit board PB may be a metal core printed circuit board (MCPCB).

A plurality of light emitting diode packages LD may be disposed on the circuit board PB. The light emitting diode packages LD generate light in response to a voltage provided from the circuit board FB. Each of the light emitting diode packages LD may have a structure, in which n-type semiconductor layer, an active layer, and a p-type semiconductor layer are sequentially laminated, and include a light emitting diode LED emitting light while an electron and a hole are re-coupled to each other when a driving voltage is applied.

The plurality of light emitting diode packages LD may emit light in the same wavelength region. Alternatively, the light source LS may include a plurality of light emitting diode packages LD emitting light in different wavelength regions. In an exemplary embodiment, each of the light emitting diode packages LD may emit first light having a central wavelength in a wavelength region of about 440 nm or more to about 460 nm or less. In an exemplary embodiment, the light emitting diode package LD may emit blue light.

Figure 5A:
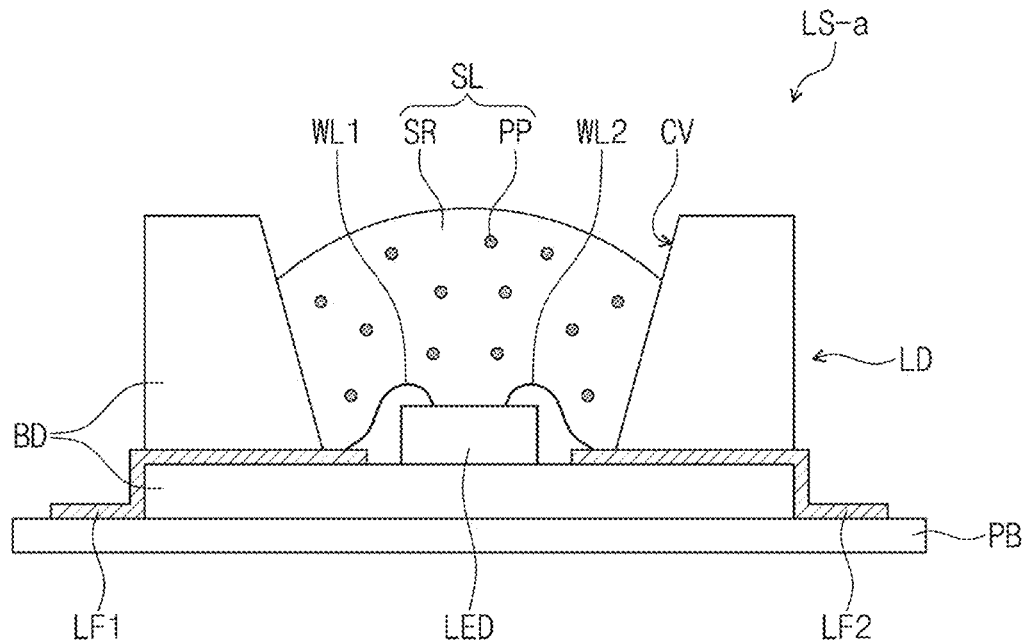
FIGS. 5A and 5B are cross-sectional views of a light source according to exemplary embodiments.
Figure 5B:
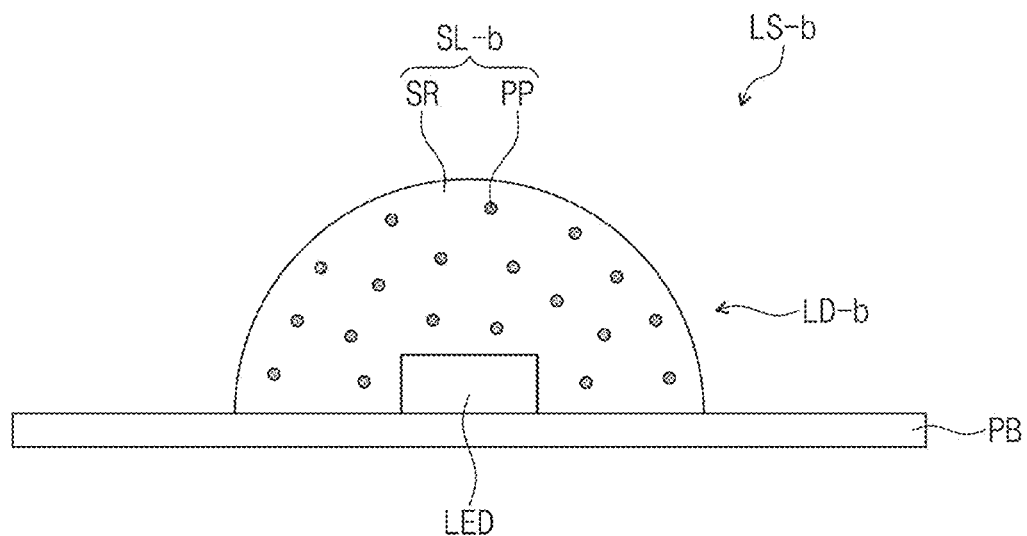

FIGS. 5A and 5B are cross-sectional views of the light source of the light source member according to exemplary embodiments. Referring to FIG. 5A, a light emitting diode package LD of a light source LS-a may include a light emitting diode LED, a pair of lead frames LF1 and LF2, and a body BD.

The body BD may mount the light emitting diode LED thereto and fix the first and second lead frames LF1 and LF2. The body BD may be made of a material, such as a polymer resin. The body BD may also include a cavity CV in which the light emitting diode LED is mounted.

The light emitting diode LED is disposed inside the cavity CV of the body BD, and a sealing part SL surrounding the light emitting diode LED and filling the cavity CV is disposed in the cavity CV. The sealing part SL may protect the light emitting diode LED. The sealing part SL may include a filling resin SR and a phosphor in an exemplary embodiment. The filling resin SR may include an epoxy resin or an acrylic resin.

The phosphor PP may include a red phosphor, a yellow phosphor, or a green phosphor, however, the inventive concepts are not limited thereto. For example, the phosphor may selectively include phosphor materials that are capable of being excited by light emitted from the light emitting diode LED. In some exemplary embodiments, the sealing part SL of the light emitting diode package LD may include the filling resin SR and the phosphor PP may be omitted.

Each of the first and second lead frames LF1 and LF2 may pass through a portion of the body BD. The lead frames LF1 and FL2, which are exposed in the cavity CV, and the light emitting diode LED may be electrically connected to each other through connection wires WL1 and WL2.

Referring to FIG. 5B, a light source member LS-b according to an exemplary embodiment may include a circuit board PB and a light emitting diode package LD-b disposed on the circuit board PB. The light emitting diode package LD-b may include a light emitting diode LED and a sealing part SL-b.

The sealing part SL-b may surround the light emitting diode LED and have a shape of, e.g., a lens. As described with reference to FIG. 5A, the sealing part SL-b may include the filling resin SR, and in some exemplary embodiments, the sealing part SL-b may further include the phosphor PP together with the filling resin SR. In some exemplary embodiments, the sealing part SL-b may include the filling resin SR and the phosphor PP may be omitted.

Each of the light sources LS-a and LS-b in FIGS. 5A and 5B may include light emitting diode LED that emits blue light, for example. In an example embodiment, a light emitting diode package LD without a separate phosphor may emit blue light.

Referring back to FIG. 4, the light emitting diode package LD may have a light emitting surface LD-O that faces one side surface of the guide panel GP. For example, the light source LS may be disposed adjacent to at least one side of the guide panel GP. The light emitting surface LD-O of the light emitting diode package LD may be a light emitting surface of the light source LS.

Referring to FIGS. 2 to 4, although the light source LS is illustrated as being disposed adjacent to one side surface of the guide panel GP, however, the inventive concepts are not limited thereto. For example, in some exemplary embodiments, the light source LS may be provided adjacent to each side surface of the guide panel GP.

In FIG. 4, the light source LS may be disposed adjacent to a light incident surface GP-I, e.g., one side surface of the guide panel GP. The light emitting surface LD-O of the light emitting diode package LD and the light incident surface GP-I of the guide panel GP may be spaced apart from each other.

The guide panel GP may be a glass substrate. However, the inventive concepts are not limited thereto. For example, in another exemplary embodiment, the guide panel GP may be a transparent resin substrate. In some exemplary embodiments, the guide panel GP may include an acrylic-based resin.

A plurality of light extraction pattern parts CP may be disposed on the bottom surface GP-B of the guide panel GP. The light extraction pattern parts CP may include a material having a reflective index different from that of the guide panel GP.

Each of the light extraction pattern parts CP may protrude from the bottom surface GP-B of the guide panel GP. Each of the light extraction pattern parts CP may have a lens shape protruding from the bottom surface GP-B of the guide panel GP. Each of the light extraction pattern parts CP may have a semi-spherical shape disposed on the bottom surface GP-B of the guide panel GP. The light extraction pattern parts CP may be integrated with the guide panel GP while protruding from the bottom surface GP-B of the guide panel GP.

The light extraction pattern parts CP may change a direction of light emitted from the light source LS and incident onto one side surface of the guide panel GP towards another side surface of the guide panel GP, or towards a light extraction surface TS, which may be the top surface of the guide panel GP. The light extraction pattern parts CP may change a path of light provided to the bottom surface GP-B of the guide panel GP toward the liquid crystal display panel DP.

The low refractive layer LRL may be disposed on the guide panel GP. The low reflective layer LRL may be disposed directly on the guide panel GP.

The low reflective layer LRL may be disposed directly on the guide panel GP to contact the light extraction surface GP-T, e.g., the top surface of the guide panel GP. For example, the low refractive layer LRL may be applied on the light extraction surface GP-T, e.g., the top surface of the guide panel GP. The low refractive layer LRL may be formed by coating, such as a slit coating, a spin coating, a roll coating, a spray coating, or an inkjet printing, however, the inventive concepts are not limited thereto. For example, in some exemplary embodiments, the low refractive layer LRL may be applied directly on the guide panel GP by using various methods, such as a transfer method.

The low refractive layer LRL may have a refractive index less than that of the guide panel GP. The low refractive layer LRL may have a refractive index in a range of about 1.0 to about 1.26. For example, a difference between the refractive indices of the low refractive layer LRL and the guide panel GP may be about 0.2 or more.

As the low refractive layer LRL has a refractive index less than that of the guide panel GP, light incident to one side surface of the guide panel GP may be effectively transmitted to another side surface of the guide panel GP, which is spaced relatively apart from the light source LS. More particular, since the low refractive layer LRL has a refractive index in a range of about 1.0 to about 1.26, which is less than that of the guide panel GP, total-reflection may occur at a boundary between the guide panel GP and the low refractive layer LRL. In this manner, light provided from the light source LS may be effectively transmitted to the other side surface of the guide panel GP, which is spaced relatively apart from the light source LS. In particular, the guide panel GP and the low refractive layer LRL, which is disposed on the guide panel GP, of the light source member LU may function as a light guide plate.

Figure 6:
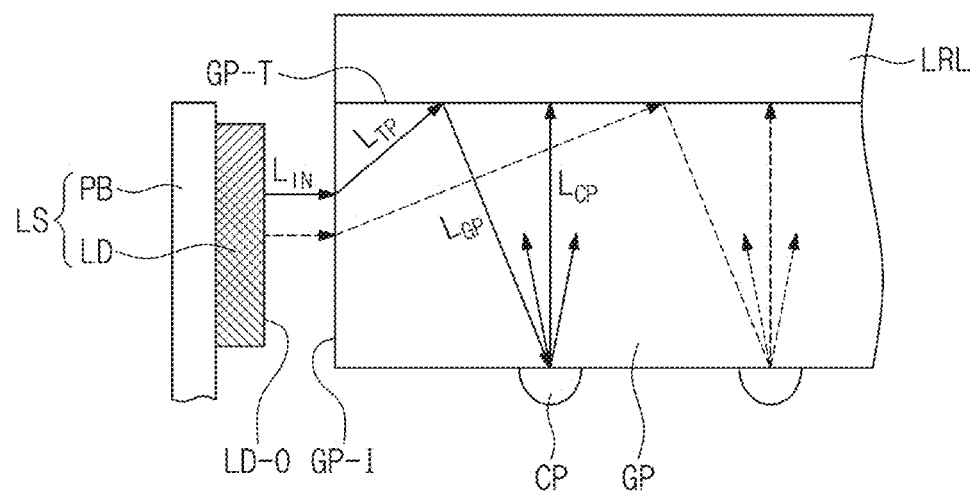
FIG. 6 is a view illustrating a light travelling path in a light source member.

FIG. 6 is a schematic view illustrating a light path according to an exemplary embodiment. FIG. 6 exemplarily illustrates a path of light emitted from the light source LS and traveling into the guide panel GP. Referring to FIG. 6, light $L_{IN}$ emitted from the light emitting surface LD-O of the light emitting diode package LD is incident onto the light incident surface GP-I, which is one side surface of the guide panel GP. Light $L_{TP}$ incident onto the guide panel GP and provided to the light extraction surface GP-T, which is the top surface of the guide panel GP, is refracted at an interface between the light extraction surface GP-T and the low refractive layer LRL towards the guide panel GP. The refracted light $L_{GP}$ may travel toward the light extraction pattern part CP. In this case, the light extraction pattern part CP may change a path of the refracted light $L_{GP}$ towards the light extraction surface GP-T. In particular, as the refracted light $L_{GP}$ provided to the light extraction pattern part CP changes the path due to different refractive indices of the light extraction pattern part CP and the guide panel GP, light $L_{GP}$ may be emitted as emission light $L_{CP}$ toward the color converting layer CCL (refer to FIG. 4).

Figure 7:
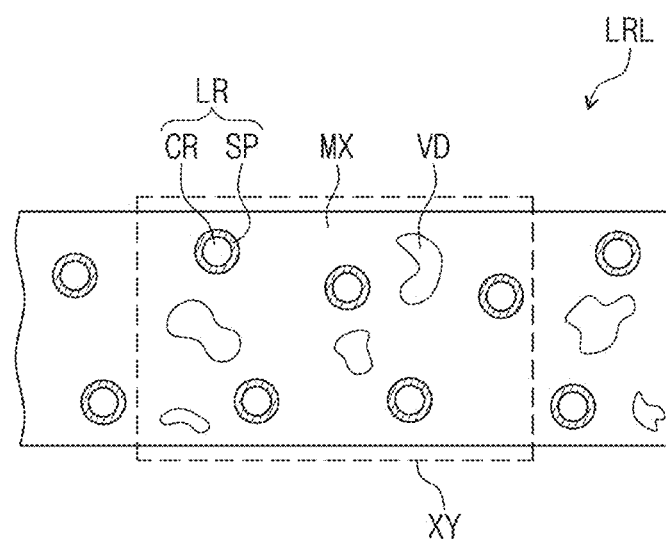
FIG. 7 is a cross-sectional view of a portion of a low refractive layer according to an exemplary embodiment.

FIG. 7 is a cross-sectional view of a low refractive layer LRL of the light source member LU according to an exemplary embodiment. The low refractive layer LRL according to an exemplary embodiment may include a matrix part MX, a plurality of low refractive substances LR dispersed in the matrix part MX, and a void VD disposed in the matrix part MX.

The matrix part MX may be a base part forming the low refractive layer LRL. The matrix part MX may be a medium, in which the low refractive substances LR are dispersed and by which the void VD is defined. The matrix part MX may include various resin compositions. For example, in some exemplary embodiments, the matrix part MX may include polysiloxane. However, the inventive concepts are not limited thereto, and the matrix part MX may be made of other organic materials.

The low refractive substances LR may be dispersed in a resin that forms the matrix part MX. Each of the low refractive substances may have a refractive index in a range of about 1.0 to about 1.3. For example, the low refractive substances LR may include hollow silica, aerogel, or porous particles having a pore. More specifically, the porous particles may be inorganic particles or organic particles, or particles including a plurality of amorphous pores.

When the low refractive substance LR has a refractive index greater than about 1.3, the light guide function of the low refractive layer LRL may be degraded because the refractive index of the low refractive layer LRL is not sufficiently low. In addition, since the low refractive substance LR includes inorganic or organic particles, the minimum refractive index thereof may be at least about 1.0.

Figure 8:
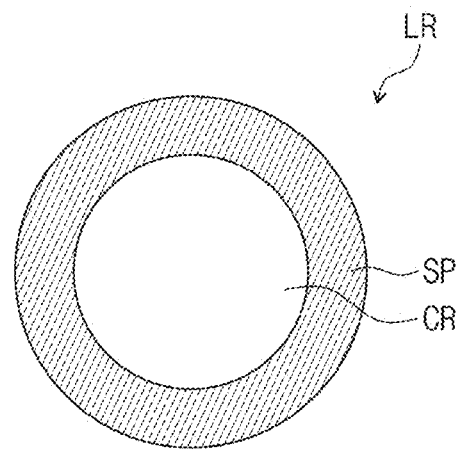
FIG. 8 is a cross-sectional view of a low refractive substance of a low refractive layer according to an exemplary embodiment.

FIG. 8 is a cross-sectional view of the low refractive substance according to an exemplary embodiment.

Referring to FIG. 8, the low refractive substance LR may have a substantially spherical shape. The low refractive substance LR according to an exemplary embodiment may have a core-shell structure, in which a core portion CR is filled with air, and a shell portion SP surrounds the core portion CR. For example, the shell portion SP may include a silica material, and the core portion CR may be filled with air, liquid, or gas having low refractive characteristics. However, the inventive concepts are not limited to a particular shape of the low refractive substance LR. The low refractive substance LR may be a particle having an inner pore corresponding to the core portion CR. For example, the low refractive substance LR may have a substantially oval sphere shape, in which a cross-section cut along a plane passing through a center thereof is an oval or an amorphous three-dimensional shape, and the shell portion SP has an amorphous shape while the core portion CR is filled with air, for example.

Referring back to FIG. 7, the low refractive layer LRL may include the void VD. The void VD may be defined by the matrix part MX surrounding the void or the like. The void VD may be filled with air, liquid, or gas having a low refractive index. However, the inventive concepts are not limited to a particular shape of the void VD. For example, in some exemplary embodiments, the void VD may have an amorphous (or arbitrary) shape. A space of the void VD may be defined by a material of the matrix part MX surrounding the void or the like. In the low refractive layer LRL, the core portion CR of the low refractive substance LR may correspond to an inner pore, and the void VD may be defined as an outer pore different from the inner pore.

In an exemplary embodiment, an area occupied by the void VD in the low refractive layer LRL may be less than about 20% of an entire area of the low refractive layer LRL. More particularly, the void VD may have an area of about 20% or less of the entire area of the low refractive layer LRL including the matrix part MX, the low refractive substance LR, and the void VD.

For example, the area of the low refractive layer LRL and the area of the void VD may be determined on the basis of a cross-section of the low refractive layer LRL. As exemplarily illustrated in FIG. 7, the cross-section of the low refractive layer LRL for calculating an area may be a plane substantially parallel to a plane defined by the first directional axis DR1 and the third directional axis DR3. However, the inventive concepts are not limited thereto. For example, the cross-section of the low refractive layer LRL for calculating an area may be a plane substantially parallel to a plane defined by the second directional axis DR2 and the third directional axis DR3.

As exemplarily illustrated in FIG. 7, a ratio of the area occupied by the void VD may be obtained by calculating a ratio of an area occupied by the void VD with respect to the entire area of the low refractive layer LRL in a unit area XY of the cross-section of the low refractive layer LRL. The ratio between the area of the void VD and the entire area of the low refractive layer LRL may be a mean value. For example, the light source member LU (refer to FIG. 2) may include the low refractive layer LRL having an arithmetic mean value of about 20% or less with respect to a ratio of the area occupied by the void VD in the unit area XY. In this case, the arithmetic mean value of the ratio of the area occupied by the void VD may be obtained by, for example, calculating a ratio of an area occupied by the void BD in the unit area XY with respect to the entire low refractive layer LRL for multiple times, and then averaging the calculated values.

The ratio of the area occupied by the void VD in the low refractive layer LRL may impact the adhesion force and refractive index of the low refractive layer LRL. When the area occupied by the void VD is greater than about 20% with respect to the entire area of the low refractive layer LRL, an internal strength of the low refractive layer LRL may be lowered by the void VD, which may the lower the delamination force (e.g., adhesion force) of the low refractive layer LRL with respect to an element adjacent thereto. More particularly, when the area occupied by the void VD is greater than about 20% with respect to the entire area of the low refractive layer LRL, an adhesion force to the guide panel GP (refer to FIG. 4) or the capping layer CPL (refer to FIG. 4) may be reduced, and thus, delamination may occur between the low refractive layer LRL and the guide panel GP (refer to FIG. 4) or between the low refractive layer LRL and the capping layer CPL (refer to FIG. 4).

Meanwhile, when the ratio of the area occupied by the void VD increases, a portion having a relatively low refractive index would be increased in the low refractive layer LRL. In this case, the low refractive layer LRL having a lower refractive index may provide an excellent light guide function together with the guide panel GP.

As such, when the ratio of the area occupied by the void VD increases in the low refractive layer LRL, the refractive index of the low refractive layer LRL may be lowered and provide an optically excellent light guide function. However, the increased ratio of the area occupied by the void VD, such as greater than about 20%, the delamination force of the low refractive layer LRL may be deteriorated, thereby degrading the reliability of the light source member LU. As such, the area occupied by the void VD in the low refractive layer LRL according to an exemplary embodiment may be controlled to be less than about 20%, so as to provide an excellent delamination force in the light source member LU while providing a low refractive index to the low refractive layer LRL.

The void VD may be generated in the process of drying or curing a resin forming the low refractive layer LRL during the process of manufacturing the low refractive layer LRL. For example, the void VD may be formed when an organic solvent containing the resin forming the low refractive layer LRL is dried or when the cured resin is heat treated.

Figure 9:
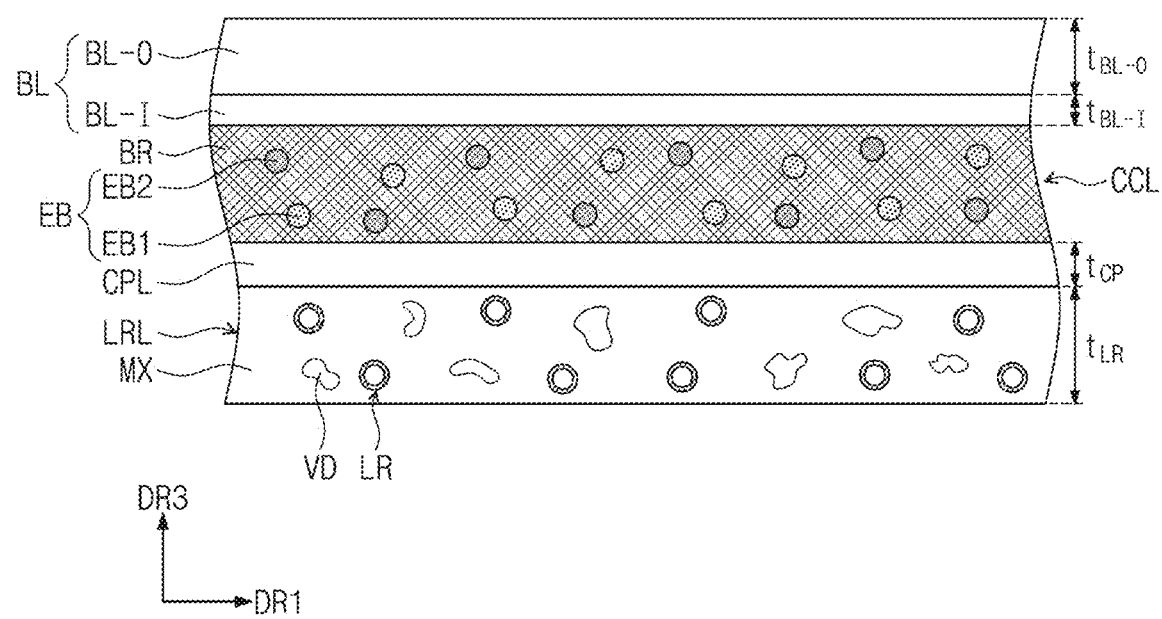
FIG. 9 is a cross-sectional view of a portion of a light source member according to an exemplary embodiment.

FIG. 9 is a cross-sectional view of one portion of the light source member LU according to an exemplary embodiment. Referring to FIGS. 2 to 8, the light source member LU includes the color converting layer CCL disposed on the low refractive layer LRL. The color converting layer CCL may include a base resin BR and quantum dot EB. The quantum dot EB may be dispersed in the base resin BR.

The color converting layer CCL may change a color of light provided from the light source LS, and transmit the light to the display panel DP. For example, light provided from the light source LS may pass through the color converting layer CCL and then be provided to the display panel DP.

The base resin BR may be a medium, in which quantum dots EB are dispersed, and may be formed by various resin compositions that are generally referred to as a binder. However, the inventive concepts are not limited thereto. For example, any medium capable of having the quantum dots EB dispersed therein may be used as the base resin BR. The base resin BR may be a polymer resin. For example, the base resin BR may include an acryl-based resin, an urethane-based resin, a silicon-based resin, and an epoxy-based resin. In some exemplary embodiments, the base resin BR may be a transparent resin.

The quantum dots EB may be particles converting a wavelength of light provided from the light source LS. The quantum dot EB may have a crystal structure having a size of several nanometers, and may include several hundred to several thousand atoms. Due to the small size of the quantum dot EB, a quantum confinement effect may be occurred to increase an energy band gap thereof. When light having a wavelength with an energy greater than that of a band gap is incident into the quantum dot EB, the quantum dot EB may become in an excited state by absorbing the light, and emit light having a specific wavelength while returning back to a ground state. The emitted light has a value corresponding to the band gap. When the quantum dot EB is adjusted in size and composition, a light emitting characteristic due to the quantum confinement effect may be adjusted.

The quantum dot QD may be selected from the group consisting of Group II-VI compound, Group III-V compound, Group IV-VI compound, Group IV element, Group IV compound, and a combination thereof.

The Group II-VI compound may be selected from the group consisting of: a binary compound selected from the group consisting of CdSe, CdTe, ZnS, ZnSe, ZnTe, ZnO, HgS, HgSe, HgTe, MgSe, MgS, and a combination thereof; a ternary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a combination thereof; and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a combination thereof.

The III-V compound may be selected from the group consisting of: a binary compound selected from the group consisting of GaN, GaP, GaAs, GaSb, AlN, AlP, AlAs, AlSb, InN, InP, InAs, InSb, and a combination thereof; a ternary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a combination thereof; and a quaternary compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a combination thereof. The IV-VI compound may be selected from the group consisting of: a binary compound selected from the group consisting of SnS, SnSe, SnTe, PbS, PbSe, PbTe, and a combination thereof; a ternary compound selected from the group consisting of SnSeS, SnSeTe, SnSTe, PbSeS, PbSeTe, PbSTe, SnPbS, SnPbSe, SnPbTe, and a combination thereof; and a quaternary compound selected from the group consisting of SnPbSSe, SnPbSeTe, SnPbSTe, and a combination thereof. The Group IV compound may be selected from the group consisting of Si, Ge, and a combination thereof. The Group IV compound may be a binary compound selected from the group consisting of SiC, SiGe, and a combination thereof.

The binary compound, the ternary compound, and the quaternary compound may exist in a particle with a uniform concentration, or exist in the same particle with a partially different concentration distribution from each other.

The quantum dot EB may have a core-shell structure including a core and a shell surrounding the core. Alternatively, the quantum dot EB may have a core-shell structure, in which one quantum dot surrounds another quantum dot. An interface between the core and the shell may have a density gradient, in which a density of an atom gradually decreases toward a center thereof.

The quantum dot EB may be a particle having a size in a nanometer scale. The quantum dot EB may have a full width at half maximum (FWHM) of a light emitting wavelength spectrum, which is equal to or less than about 45 nm, in some exemplary embodiments, equal to or less than about 40 nm, and in some exemplary embodiments, equal to or less than about 30 nm. In this range, a color purity or a color gamut property may be improved. Also, since light emitted through the above-described quantum dot EB is emitted in all directions, a light viewing angle may be improved.

While the shape of the quantum dot EB is as known in the art, the inventive concepts are not limited to a particular shape of the quantum dot EB. More specifically, the quantum dot EB may have a shape such as a globular shape, a pyramid shape, a multi-arm shape, or a shape of a nano-particle, a nano-tube, a nano-wire, a nano-fiber, or a nano-plate shaped particle of a cubic.

In an exemplary embodiment, the color converting layer CCL may include a plurality of quantum dots EB1 and EB2 converting incident light into light having colors of different wavelength regions from each other. For example, the color converting layer CCL may include at least one of a first quantum dot EB1 converting first light in a first wavelength region, which is provided from the light source LS, into second light in a second wavelength region to emit the converted light, and a second quantum dot EB2 converting the first light in the first wavelength region into third light in a third wavelength region to emit the converted light. For example, the first light may have a central wavelength in a wavelength range of about 440 nm to about 460 nm, the second light may have a central wavelength in a wavelength range of about 520 nm to about 550 nm, and the third light may have a central wavelength in a wavelength range of about 600 nm to about 650 nm. Alternatively, the second quantum dot EB2 may be excited by the second light to emit the third light.

When light provided from the light source LS is the first light having a wavelength region of blue light, the color converting layer CCL may include the first quantum dot EB1 that may be excited by the blue light to emit green light, and the second quantum dot EB2 that may be excited by the blue light to emit red light. More specifically, the blue light has a central wavelength in a wavelength range of about 440 nm to about 460 nm, the green light has a central wavelength in a wavelength range of about 520 nm to about 550 nm, and the red light has a central wavelength in a wavelength range of about 600 nm to about 650 nm. However, the inventive concepts are not limited thereto. For example, in some exemplary embodiments, each of the blue light, the green light, and the red light may include any wavelength ranges that may be recognized as the blue light, the green light, and the red light in the art.

Each of the quantum dots EB1 and EB2 may emit different color of light depending on a particle sizes thereof, and the first quantum dot EB1 and the second quantum dot EB2 may have different particle size from each other. For example, the first quantum dot EB1 may have a particle size less than that of the second quantum dot EB2. In this case, the first quantum dot EB1 may emit light having a wavelength shorter than that emitted from the second quantum dot EB2.

Referring to FIG. 9, the light source member LU according to an exemplary embodiment may include a capping layer CPL disposed between the low refractive layer LRL and the color converting layer CCL, and a barrier layer BL disposed on the color converting layer CCL.

The capping layer CPL may be a protection layer disposed on the low refractive layer LRL to protect the low refractive layer LRL. The capping layer CPL may be an inorganic layer including at least one of a silicon nitride, a silicon oxide, and a silicon oxynitride. The capping layer CPL may be disposed directly on the low refractive layer LRL. The capping layer CPL may be formed by a single layer or a plurality of layers.

In the light source member LU according to an exemplary embodiment, the low refractive layer LRL may have a thickness $t_{LR}$ in a range of about 0.5 μm to about 2.5 μm. When the low refractive layer LRL has a thickness $t_{LR}$ less than about 0.5 μm, the low refractive layer LRL may be degraded in light guide function with respect to light provided to the guide panel GP. Also, when the low refractive layer LRL has a thickness $t_{LR}$ greater than about 2.5 μm, a crack may be generated in the low refractive layer LRL to deform the low refractive layer LRL.

The capping layer CPL may have a thickness $t_{CP}$ of at least about 0.2 μm. When the capping layer CPL has a thickness $t_{CP}$ less than about 0.2 μm, the protection layer may not sufficiently protect the low refractive layer LRL under a reliability test condition of high temperature and/or high humidity, which may degrade the reliability of the low refractive layer LRL.

Referring to FIG. 9, the barrier layer BL may be disposed on the color converting layer CCL. The barrier layer BL may block moisture and/or oxygen (hereinafter, referred to as "moisture/oxygen") from being introduced. Alternatively, in some exemplary embodiments, the barrier layer BL may cover the color converting layer CCL.

The barrier layer BL may include at least one inorganic layer BL-I. In particular, the barrier layer BL may include an inorganic material. For example, the barrier layer BL may be formed by at least one inorganic layer BL-I including a silicon nitride, an aluminum nitride, a zirconium nitride, a titanium nitride, a hafnium nitride, a tantalum nitride, a silicon oxide, an aluminum oxide, a titanium oxide, a tin oxide, a cerium oxide, a silicon oxynitride, or a metal thin-film securing a light transmittance. Also, the barrier layer BL may further include an organic layer BL-O. The organic layer BL-O may be disposed on the inorganic layer BL-I. The barrier layer BL may be formed by a single layer or a plurality of layers.

The at least one inorganic layer BL-I of the barrier layer BL may have a thickness $t_{BL-I}$ that is similar to the thickness $t_{CP}$ of the capping layer CPL. For example, the at least one inorganic layer BL-I may have a thickness $t_{BL-I}$ of at least about 0.2 μm. When the at least one inorganic layer BL-I has a thickness $t_{BL-I}$ of at least about 0.2 μm, the at least one inorganic layer may protect the color converting layer CCL from moisture/oxygen.

When the barrier layer BL includes the organic layer BL-O, the organic layer BL-O may have a thickness $t_{BL-O}$ of at least about 3 μm. When the organic layer BL-O has a thickness $t_{BL-O}$ of at least about 3 μm, the organic layer may protect the color converting layer CCL from moisture/oxygen.

Figure 10A:
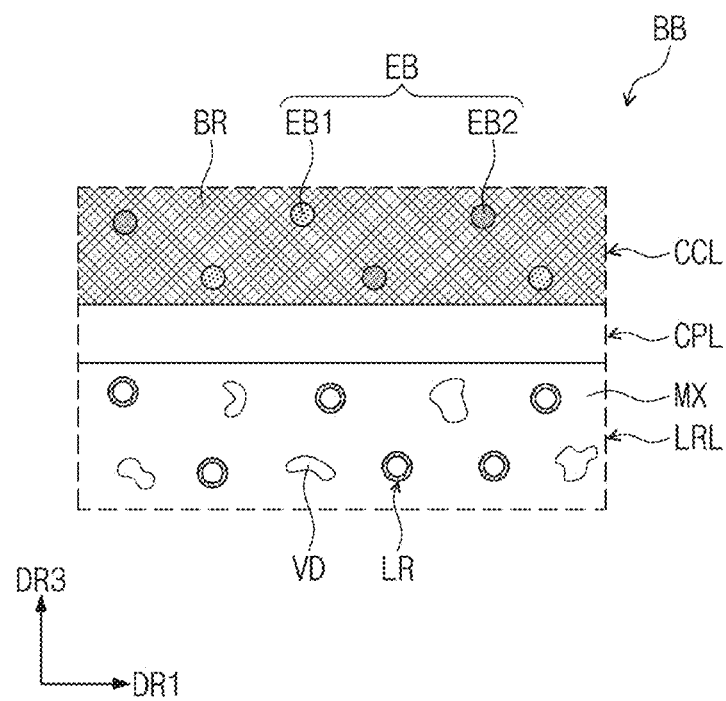
FIGS. 10A and 10B are cross-sectional views of a portion of a light source member according to exemplary embodiments.
Figure 10B:
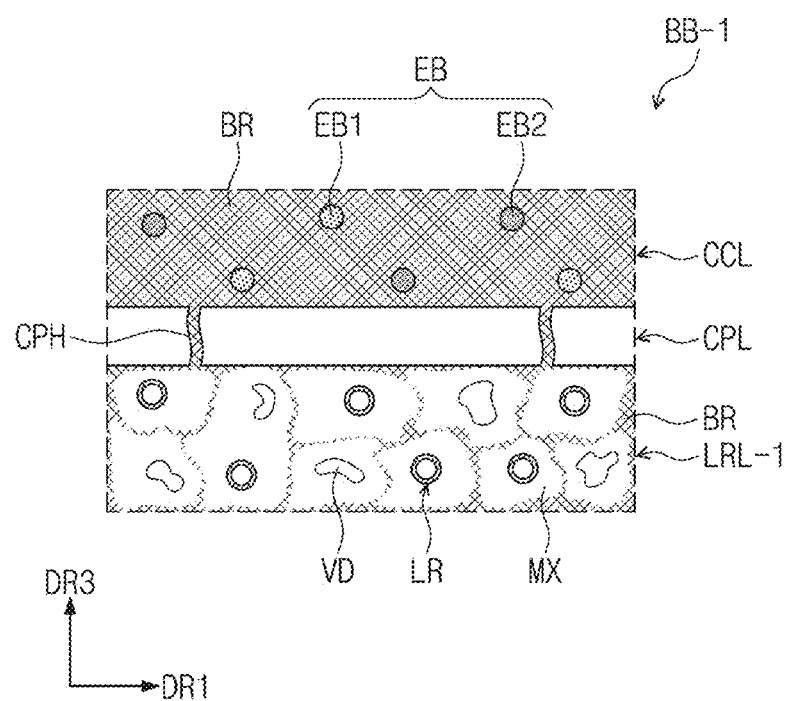

FIG. 10A is a cross-sectional view of a portion BB of FIG. 4 according to an exemplary embodiment. FIG. 10B is a cross-sectional view of a portion BB of FIG. 4 according to another exemplary embodiment.

Referring to FIG. 10A, the portion BB of FIG. 4 includes the low refractive layer LRL, the capping layer CPL, and the color converting layer CCL, which are sequentially laminated. The low refractive layer LRL may include the matrix part MX, the low refractive substance LR, and the void VD.

Referring the FIG. 10B, the portion BB of FIG. 4 according to another exemplary embodiment (e.g., the portion BB-1) further includes a base resin BR forming the color converting layer CCL disposed on a low refractive layer LRL-1. In particular, the low refractive layer LRL-1 according to the illustrated exemplary embodiment may further include the base resin BR in addition to the matrix part MX, the low refractive substance LR, and the void VD.

The base resin BR, which forms the color converting layer CCL, may be permeated into the low refractive layer LRL-1 through a crack portion CPH of the capping layer CPL. The base resin BR permeated into the low refractive layer LRL-1 may include substantially the same material as or a different material from the resin forming the matrix part MX.

The base resin BR may be filled in a portion of the low refractive layer LRL-1, which is not filled with the matrix part MX. For example, the base resin BR may surround the matrix part MX and be filled in the low refractive layer LRL-1. Referring to FIG. 10B, the void VD may be defined and maintained by the matrix part MX.

Alternatively, in some exemplary embodiments, the void VD may be defined by the filled base resin BR unlike in FIG. 10B. For example, the low refractive layer LRL may include a first void VD defined by being surrounded by the matrix part MX and a second void defined by being surrounded by the base resin BR, in addition to the low refractive substance LR, the matrix part MX, and the base resin BR.

Figure 11A:
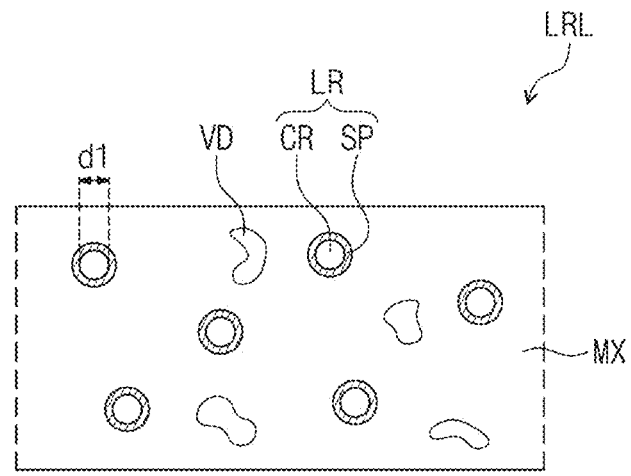
FIGS. 11A and 11B are cross-sectional views of a portion of a low refractive layer according to exemplary embodiments.
Figure 11B:
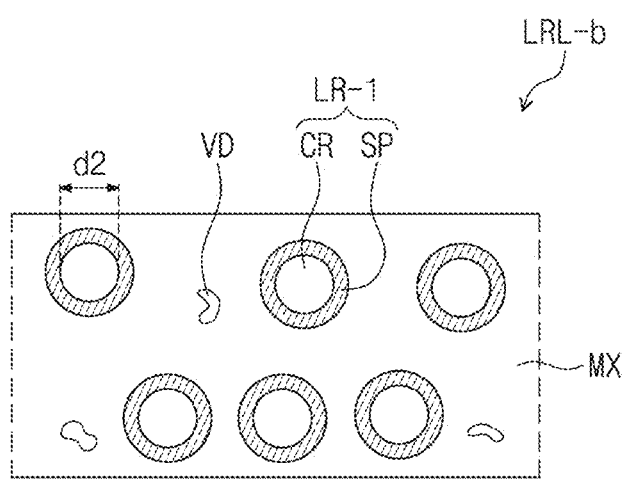

FIGS. 11A and 11B are cross-sectional views of low refractive layers including low refractive substances having different sizes according to exemplary embodiments. FIGS. 11A and 11B exemplarily illustrate cross-sections of the low refractive layers LRL and LRL-b having the same area as each other, respectively.

FIG. 11B exemplarily illustrates the low refractive layer LRL-b including a low refractive substance LR-1, in which a core portion CR has a greater diameter in comparison with that of FIG. 11A. FIG. 11A is a cross-sectional view of the low refractive layer LRL including the low refractive substance LR, in which the core portion CR has a diameter of d1, and FIG. 11B is a cross-sectional view of the low refractive layer LRL-b including a low refractive substance LR-1, in which a core portion CR has a diameter of d2.

When the low refractive layers LRL and LRL-b in FIGS. 11A and 11B have refractive indices similar to each other, the low refractive layer LRL-b including the low refractive substance LR-1 with a relatively greater diameter as shown in FIG. 11B may have a smaller area occupied by the void BD than that of the low refractive layer LRL in FIG. 11A. More particularly, as the core portion CR of the low refractive substance LR and LR-1 increases in diameter, the inner pore of the low refractive substance LR and LR-1 may be increased, and thus, the refractive index of the low refractive substance LR and LR-1 may be decreased. As such, when the low refractive layers LRL and LRL-b include the same number of low refractive substance LR and LR-1 per unit area, the low refractive layer LRL-b including the low refractive substance LR-1, in which the core portion has a relatively greater diameter, may have a refractive index similar to that of the low refractive layer LRL including the low refractive substance LR, in which the core portion has a relatively smaller diameter, although the ratio of the area occupied by the void VD is reduced.

More particularly, the refractive index and delamination force of the low refractive layer LRL and LRL-b may be controlled by adjusting areas of the void VD and sizes of the inner pores of the low refractive substance LR and LR-1 of the low refractive layer LRL and LRL-b.

Table 1 shows an evaluation result of the low refractive layer of the light source member according to an exemplary embodiment. Table 1 shows evaluation results of delamination force and ratios of area occupied by the void in the low refractive layers between an exemplary embodiment and a comparative example.

The delamination force shown in table 1 represents a level of the delamination force evaluated by performing a cross-cut test (ASTM D3359) on the low refractive layer. The delamination force is evaluated by cross-cutting the low refractive layer into a grid pattern, then attaching a pressure sensitive adhesion tape to the low refractive layer that has been cut, and delaminating the attached adhesion tape at an angle of about 180°. The degree of the delamination force is evaluated in levels ranging from 0 to 5. Here, a level of 0 represents a case in which about 65% or more of the cut portion has been removed after the adhesion tape is delaminated, and a level of 5 represents a case in which no portion of the cut portion has been removed after the adhesion tape is delaminated.

An area ratio % of the void is calculated by analyzing a SEM image that photographs the cross-section of the low refractive layer. The area ratio % of the void is expressed by a ratio of an area occupied by the void with respect to a unit area of the low refractive layer in the photographed cross-sectional image of the low refractive layer.

Figure 12A:
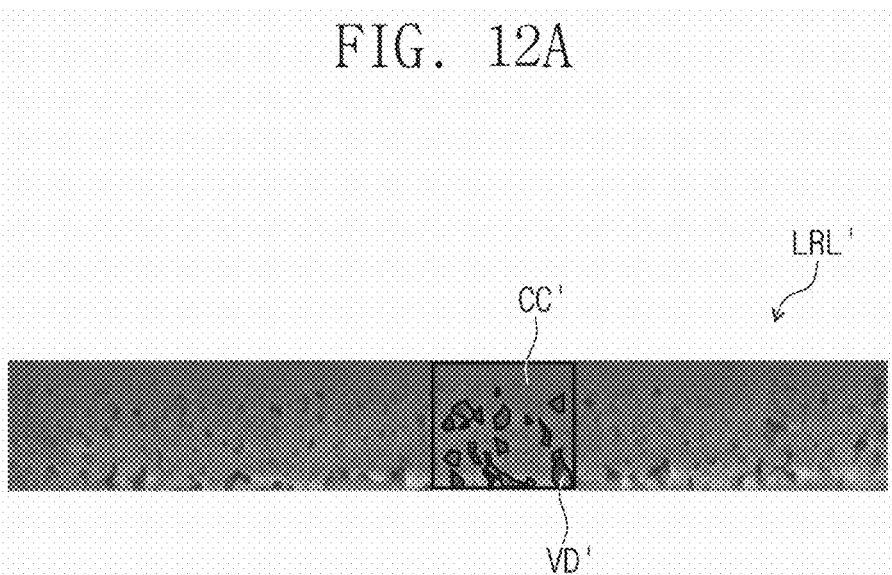
FIG. 12A is a SEM image illustrating a cross-section of a low refractive layer according to a comparative example.
Figure 12B:
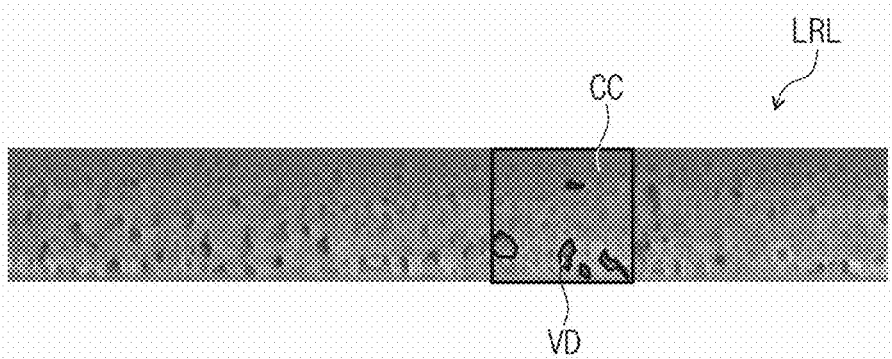
FIG. 12B is a SEM image illustrating a cross-section of a low refractive layer according to an exemplary embodiment.

FIG. 12A is a view illustrating a cross-sectional image of a low refractive layer LRL' according to a comparative example, and FIG. 12B is a view illustrating a cross-sectional image of the low refractive layer LRL according to an exemplary embodiment. Area ratios of voids VD' and VD are expressed by calculating areas of the voids VD' and VD in portions corresponding to regions of CC' and CC, which correspond to unit areas of the cross-sectional images of the low refractive layers LRL' and LRL.

TABLE 1

| Classification | Area ratio of void | Level of delamination force |
|---|---|---|
| Comparative example | 30% | 1 |
| Exemplary Embodiment | 20% | 4 |

Referring to Table 1, when the area of the void in the low refractive layer is controlled to be about 20% or less, the delamination force of the low refractive layer is improved.

The light source member according to exemplary embodiments may include the refractive layer disposed between the guide panel and the color converting layer to effectively transmit light provided from the light source toward the color converting layer, in which the area of the void in the low refractive layer may be controlled to be about 20% or less to improve the delamination force of the low refractive layer, thereby improving the reliability. More particularly, the light source member according to the exemplary embodiments may include the low refractive layer, and the low refractive layer may include the low refractive substances having the inner pore and the external pore defined by the void to maintain a low refractive index, thereby providing the light guide function together with the guide panel. Also, in the light source member according to the exemplary embodiments, as the area ratio of the external pore corresponding to the void in the low refractive layer is controlled to be about 20% or less, the delamination force of the low refractive layer with respect to a layer adjacent thereto may be improved, and thus, the light source member may have improved reliability.

Referring back to FIGS. 1 to 3, the display device DD according to an exemplary embodiment may include the light source member LU and the display panel DP disposed on the light source member LU, and the display panel DP may be a liquid crystal panel including the first substrate SUB1, the second substrate SUB2, and the liquid crystal layer LCL disposed between the first substrate SUB1 and the second substrate SUB2.

In the display device DD according to an exemplary embodiment, the light source member LU and the display panel DP may be spaced apart from each other. For example, the display panel DP may be disposed on the light source member LU without an additional adhesion member disposed therebetween. More specifically, an air gap may be defined between the light source member LU and the display panel DP.

The display device DD according to an exemplary embodiment may include the light source member LU described above.

More particularly, the light source member LU of the display device DD according to an exemplary embodiment may include the low refractive layer LRL for performing the light guide function, and the low refractive layer LRL may include the void VD (refer to FIG. 7) having the area ratio of about 20% or less of the entire area of the low refractive layer LRL to have an excellent adhesion force with the guide panel GP or the color converting layer CCL, which is adjacent thereto. Also, when the light source member LU of the display device DD according to an exemplary embodiment includes the capping layer CPL, the low refractive layer LRL may include the void VD (refer to FIG. 7) having the area ratio of about 20% or less of the entire area of the low refractive layer LRL to have an excellent adhesion force with the guide panel GP or the capping layer CPL, which is adjacent thereto.

The display device according to an exemplary embodiment may include the light source member including the color converting layer with the quantum dot therein and the low refractive layer for controlling the area ratio of the void to have high color gamut and produce excellent reliability test results. In particular, the area ratio of the void in the low refractive layer may be controlled in the display device according to an exemplary embodiment to provide the light guide function and to improve the delamination force with adjacent optical members. In this manner, the low refractive layer may perform the excellent light guide function and have the excellent reliability, and the display device including the same may have an improved quality.

Exemplary embodiments provide the light source member having excellent delamination force by controlling the area of the void included in the low refractive layer to have improved reliability.

Exemplary embodiments also provide a display device including the light source member that includes the color converting layer and the low refractive layer, which has an improved reliability and excellent color gamut by improving the delamination force of the low refractive layer.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A light source member comprising:
a guide panel;
a light source disposed adjacent to at least one side of the guide panel;
a low refractive layer disposed on the guide panel; and
a color converting layer disposed on the low refractive layer and comprising a base resin and a quantum dot dispersed in the base resin,
wherein:
the low refractive layer comprises a matrix part, a plurality of low refractive substances dispersed in the matrix part, and a void disposed in the matrix part; and
an area occupied by the void is less than about 20% of an entire area of the low refractive layer.

2. The light source member of claim 1, wherein the low refractive layer has a refractive index in a range of about 1.0 to about 1.26.

3. The light source member of claim 1, wherein the low refractive substances comprise at least one of hollow silica, aerogel, a porous inorganic particles including a pore, and a porous organic particles including a pore.

4. The light source member of claim 1, further comprising a capping layer disposed between the low refractive layer and the color converting layer, the capping layer including at least one of a silicon nitride, a silicon oxide, and a silicon oxynitride.

5. The light source member of claim 4, wherein the capping layer has a thickness of at least about 0.2 μm.

6. The light source member of claim 1, further comprising a barrier layer disposed on the color converting layer and comprising at least one inorganic layer.

7. The light source member of claim 6, wherein the barrier layer further comprises an organic layer disposed on the at least one inorganic layer.

8. The light source member of claim 1, wherein the low refractive layer has a thickness in a range of about 0.5 μm to about 2.5 μm.

9. The light source member of claim 1, wherein the low refractive layer further comprises a resin.

10. The light source member of claim 1, wherein the guide panel comprises a plurality of light extraction pattern parts disposed on a bottom surface thereof.

11. The light source member of claim 10, wherein each of the light extraction pattern parts has a convex lens shape protruding from the bottom surface of the guide panel.

12. The light source member of claim 1, wherein the light source comprises a circuit board and a light emitting diode package disposed on the circuit board.

13. The light source member of claim 12, wherein:
the light emitting diode package is configured to emit first light having a central wavelength in a range of about 440 nm to about 460 nm; and
the quantum dot comprises at least one of:
a first quantum dot configured to be excited by the first light to emit second light having a central wavelength in a wavelength range of about 520 nm to about 550 nm; and
a second quantum dot configured to be excited by at least one of the first light and the second light to emit third light having a central wavelength in a wavelength range of about 600 nm to about 650 nm.

14. The light source member of claim 1, wherein:
the light source is configured to emit blue light; and
the quantum dot comprises at least one of a first quantum dot configured to be excited by the blue light to emit green light, and a second quantum dot configured to be excited by the blue light to emit red light.

15. A light source member comprising:
a light source configured to emit blue light;
a guide panel having one side surface facing a light emitting surface of the light source;
a low refractive layer disposed on the guide panel;
a capping layer disposed on the low refractive layer and including an inorganic material;
a color converting layer disposed on the capping layer and comprising a quantum dot; and
a barrier layer disposed on the color converting layer, wherein:
the low refractive layer comprises a matrix part, a plurality of low refractive substances dispersed in the matrix part, and a void disposed in the matrix part; and
an area occupied by the void is less than about 20% of an entire area of the low refractive layer.

16. The light source member of claim 15, wherein the low refractive layer is disposed directly on the guide panel.

17. The light source member of claim 15, wherein the barrier layer covers the color converting layer.

18. A display device comprising:
a light source member; and
a display panel disposed on the light source member,
wherein the light source member comprises:
a guide panel;
a light source disposed adjacent to at least one side of the guide panel;
a low refractive layer disposed on the guide panel; and
a color converting layer disposed on the low refractive layer and comprising a base resin and a quantum dot dispersed in the base resin,
wherein the low refractive layer comprises a matrix part, a plurality of low refractive substances dispersed in the matrix part, and a void disposed in the matrix part, and
wherein an area occupied by the void is less than about 20% of an entire area of the low refractive layer.

19. The display device of claim 18, wherein the display panel includes a liquid crystal display panel comprising a first substrate, a second substrate, and a liquid crystal layer disposed between the first substrate and the second substrate.

20. The display device of claim 18, wherein the light source member and the display panel are spaced apart from each other.

* * * * *